United States Patent
Takeguchi

(10) Patent No.: US 12,437,920 B2
(45) Date of Patent: Oct. 7, 2025

(54) MULTILAYER CERAMIC CAPACITOR

(71) Applicant: TAIYO YUDEN CO., LTD., Tokyo (JP)

(72) Inventor: Kazunobu Takeguchi, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 213 days.

(21) Appl. No.: 18/167,370

(22) Filed: Feb. 10, 2023

(65) Prior Publication Data

US 2023/0268124 A1    Aug. 24, 2023

(30) Foreign Application Priority Data

Feb. 22, 2022    (JP) ................... 2022-025233

(51) Int. Cl.
*H01G 4/012*    (2006.01)
*H01G 4/008*    (2006.01)
*H01G 4/30*    (2006.01)

(52) U.S. Cl.
CPC .......... *H01G 4/012* (2013.01); *H01G 4/0085* (2013.01); *H01G 4/30* (2013.01)

(58) Field of Classification Search
CPC ......... H01G 4/30; H01G 4/012; H01G 4/0085
See application file for complete search history.

(56) References Cited

U.S. PATENT DOCUMENTS

2014/0083755 A1   3/2014   Lee et al.
2014/0355177 A1*  12/2014  Lee .................... H01G 4/012
                                              29/25.03
2015/0075854 A1   3/2015   You et al.
2017/0164466 A1*  6/2017   Park ................... H01G 4/018
                   (Continued)

FOREIGN PATENT DOCUMENTS

JP    2014-72515 A     4/2014
JP    2015-061074 A    3/2015
(Continued)

OTHER PUBLICATIONS

Japanese Office Action dated Aug. 26, 2025 in a counterpart Japanese patent application No. 2022-025233. (A machine translation (not reviewed for accuracy) attached.).

*Primary Examiner* — Timothy J. Dole
*Assistant Examiner* — Kaemon Eli Watada
(74) *Attorney, Agent, or Firm* — CHEN YOSHIMURA LLP

(57) ABSTRACT

A multilayer ceramic capacitor includes a ceramic body including a plurality of first and second internal electrodes alternately laminated via a plurality of ceramic layers in the direction of the first axis; and first and second external electrodes covering the end surfaces of the ceramic body, respectively, wherein the plurality of first and second internal electrodes respectively include a plurality of first and second standard internal electrodes having a common configuration, respectively, and a plurality of first and second special internal electrode that have a configuration different from the plurality of first standard internal electrodes, and wherein the plurality of first and second special internal electrodes are successively laminated in a section of the ceramic body that is closer to one side of one of the first and second main surfaces than a center in the direction of the first axis.

6 Claims, 15 Drawing Sheets

(56) References Cited

U.S. PATENT DOCUMENTS

| | | |
|---|---|---|
| 2019/0279824 A1 | 9/2019 | Sim et al. |
| 2022/0199330 A1* | 6/2022 | Kwon .................... H01G 4/012 |
| 2022/0208470 A1* | 6/2022 | Lee ........................ H01G 2/065 |

FOREIGN PATENT DOCUMENTS

| | | |
|---|---|---|
| JP | 2019-129183 A | 8/2019 |
| JP | 2019-161212 A | 9/2019 |

\* cited by examiner

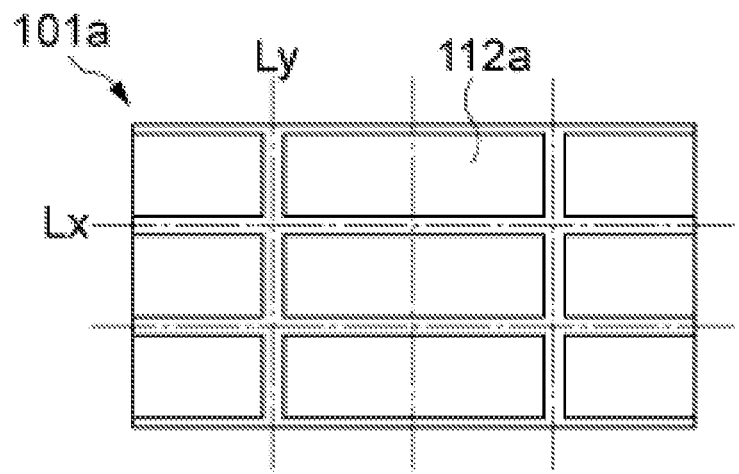
FIG. 7A
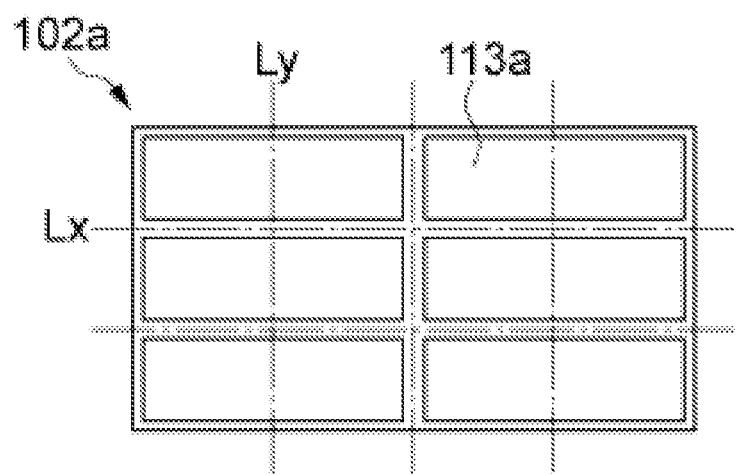
FIG. 7B
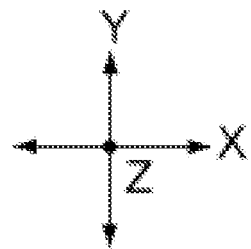

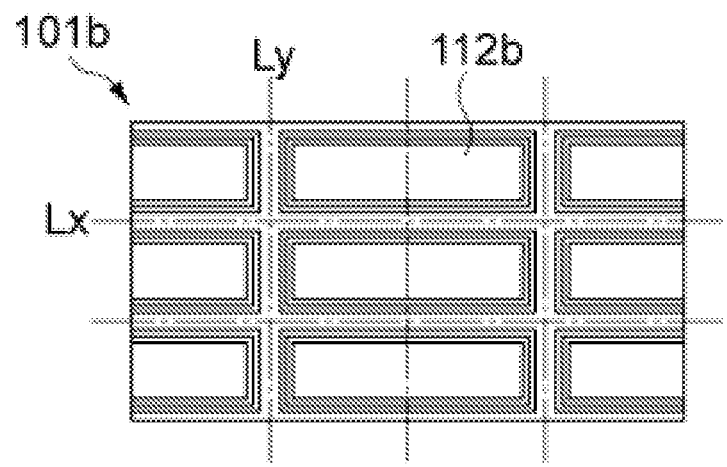
FIG. 8A
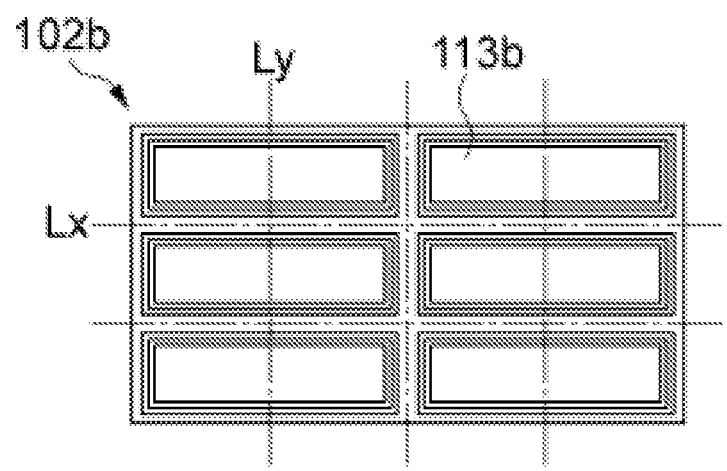
FIG. 8B
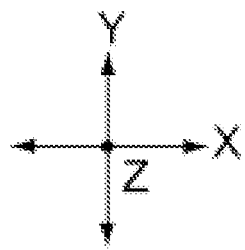

MULTILAYER CERAMIC CAPACITOR

BACKGROUND OF THE INVENTION

Technical Field

The present invention relates to traceability of multilayer ceramic capacitors.

Background Art

A multilayer ceramic capacitor has a structure in which a pair of external electrodes are provided on a ceramic body in which a plurality of internal electrodes are laminated. In a general manufacturing process of a multilayer ceramic capacitor, a plurality of ceramic bodies can be manufactured at once by cutting laminated sheets obtained in a lamination process of laminating a plurality of ceramic sheets.

For multilayer ceramic capacitors, it is effective to increase the number of laminated layers in the ceramic body in order to increase the capacitance while keeping the mounting area small. In the lamination process, the ceramic sheets are stacked one by one from the bottom, and pressure is repeatedly applied each time. Therefore, the greater the number of laminated sheets, the greater the difference in the number of times pressurizations occur between the upper portion and the lower portion.

In a ceramic body with a large number of laminations, there is a tendency for defects to occur more easily in either the upper portion or the lower portion due to such a difference in the number of pressurizations. For this reason, in order to take countermeasures against the occurrence of defects, it is useful for multilayer ceramic capacitors to be able to distinguish between the upper portion and the lower portion of the ceramic body after manufacturing.

In the multilayer ceramic capacitor described in Patent Document 1, the lower cover portion of the ceramic body is provided with an identification layer having a color different from that of the upper cover portion. In this multilayer ceramic capacitor, the upper portion and the lower portion of the ceramic body can be visually distinguished from each other by the presence or absence of the colored identification layer.

RELATED ART DOCUMENT

Patent Document

Patent Document 1: Japanese Patent Application Laid-Open Publication No, 2014-72515

SUMMARY OF THE INVENTION

In the multilayer ceramic capacitor described in Patent Document 1, it is conceivable that the additive for changing the color of the identification layer diffuses into the ceramic body, adversely affecting the electrical characteristics. For this reason, there is a demand for a technique capable of distinguishing between the upper portion and the lower portion of the ceramic body without using additives in the ceramic body.

In view of the above circumstances, an object of the present invention is to improve the traceability of multilayer ceramic capacitors.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multilayer ceramic capacitor, comprising: a ceramic body having first and second main surfaces perpendicular to a first axis and first and second end surfaces perpendicular to a second axis orthogonal to the first axis, the ceramic body including: a plurality of ceramic layers laminated in a direction of the first axis, and a plurality of first and second internal electrodes alternately laminated with the plurality of ceramic layers respectively interposed therebetween in the direction of the first axis, the first and second internal electrodes being drawn out to the first and second end surfaces, respectively; and first and second external electrodes covering the first and second end surfaces of the ceramic body, respectively, wherein the plurality of first and second internal electrodes include a plurality of first and second standard internal electrodes having a common configuration, respectively, and a plurality of first and second special internal electrode that have a configuration different from the plurality of first standard internal electrodes, respectively, and wherein the plurality of first and second special internal electrodes are successively laminated in a section of the ceramic body that is closer to one side of one of the first and second main surfaces than a center in the direction of the first axis.

In this multilayer ceramic capacitor, the first and second special internal electrodes having different configurations from the first and second standard internal electrodes are present only on one side of the first and second main surfaces. Thus, in this multilayer ceramic capacitor, even after manufacturing, it is possible to distinguish between the first main surface and the second main surface of the ceramic body by the positions of the first and second special internal electrodes.

The plurality of first and second special internal electrodes respectively may have a common configuration.

The plurality of first and second special internal electrodes respectively may have a planar shape that is different from the plurality of first and second standard internal electrodes.

The plurality of first and second special internal electrodes may have a planar shape that is same as the plurality of first and second standard internal electrodes except that a gap is provided in the planar shape of the first and second special internal electrodes.

The plurality of first and second special internal electrodes respectively may have a rectangular outline common to the plurality of first and second standard internal electrodes.

In the plurality of first and second special internal electrodes, an area density of a metal material may be different from that in the plurality of first and second standard internal electrodes.

In the plurality of first and second special internal electrodes, an area density of a metal material may be lower than that in the plurality of first and second standard internal electrodes.

In the ceramic body, a dimension in the direction of the first axis may be larger than a dimension in a direction of a third axis perpendicular to the first axis and the second axis.

According to at least some of these aspects of the present invention, traceability of multilayer ceramic capacitors can be improved.

It is to be understood that both the foregoing general description and the following detailed description are exemplary and explanatory, and are intended to provide further explanation of the invention as claimed.

BRIEF DESCRIPTION OF THE DRAWINGS

FIGS. 7A-7B are plan views of standard ceramic sheets prepared in step S01.

FIGS. 8A-8B are plan views of special ceramic sheets prepared in step S01.

DETAILED DESCRIPTION OF EMBODIMENTS

Figure 1:
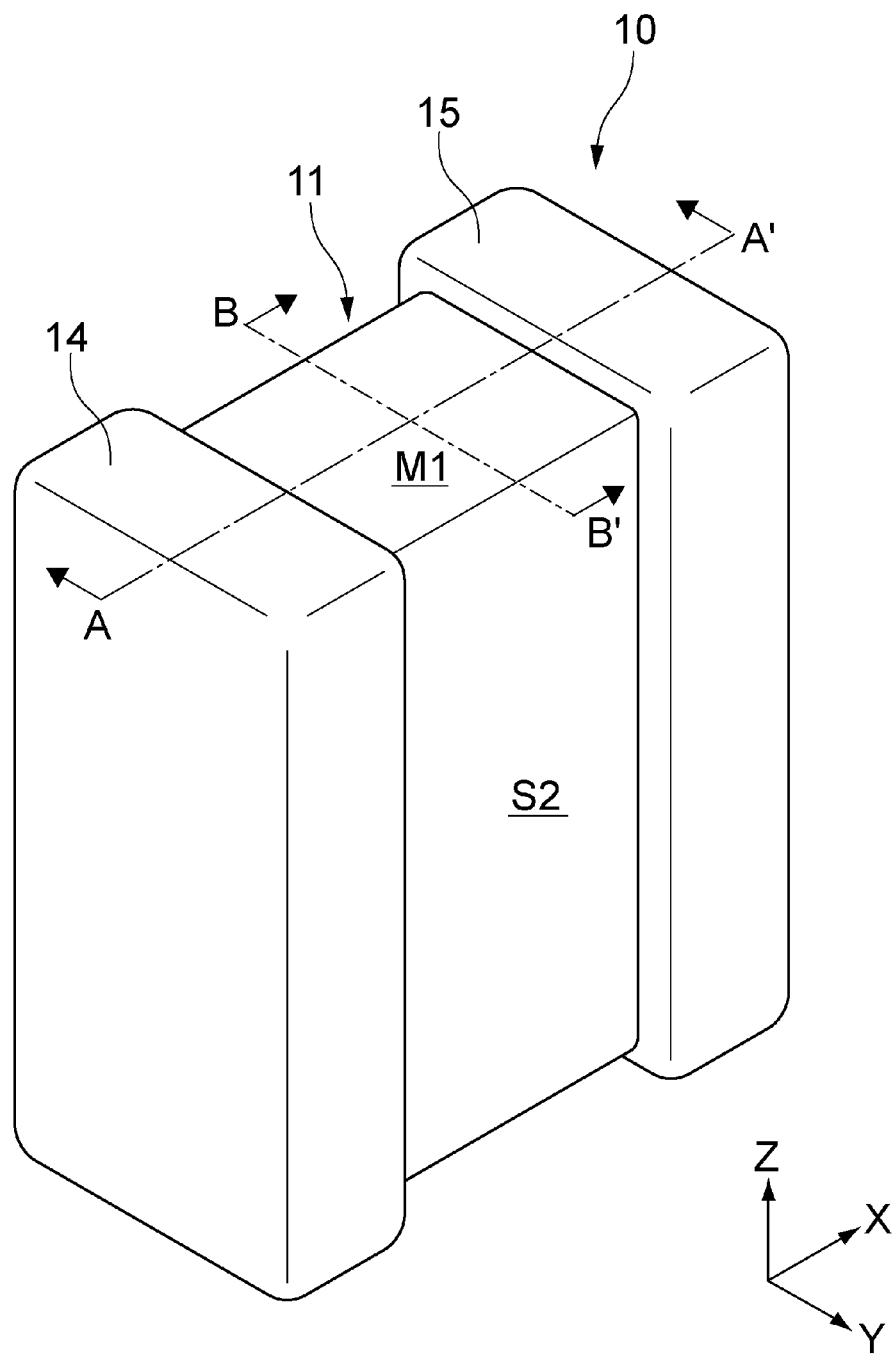
FIG. 1 is a perspective view of a multilayer ceramic capacitor according to an embodiment of the present invention.

A multilayer ceramic capacitor 10 according to embodiments of the present invention will be described below with reference to the drawings. In the drawings, X-axis, Y-axis, and Z-axis that are orthogonal to each other are shown as appropriate. The X-axis, Y-axis, and Z-axis define a fixed coordinate system fixed with respect to the multilayer ceramic capacitor 10.

[Structure of Multilayer Ceramic Capacitor 10]

Figure 2:
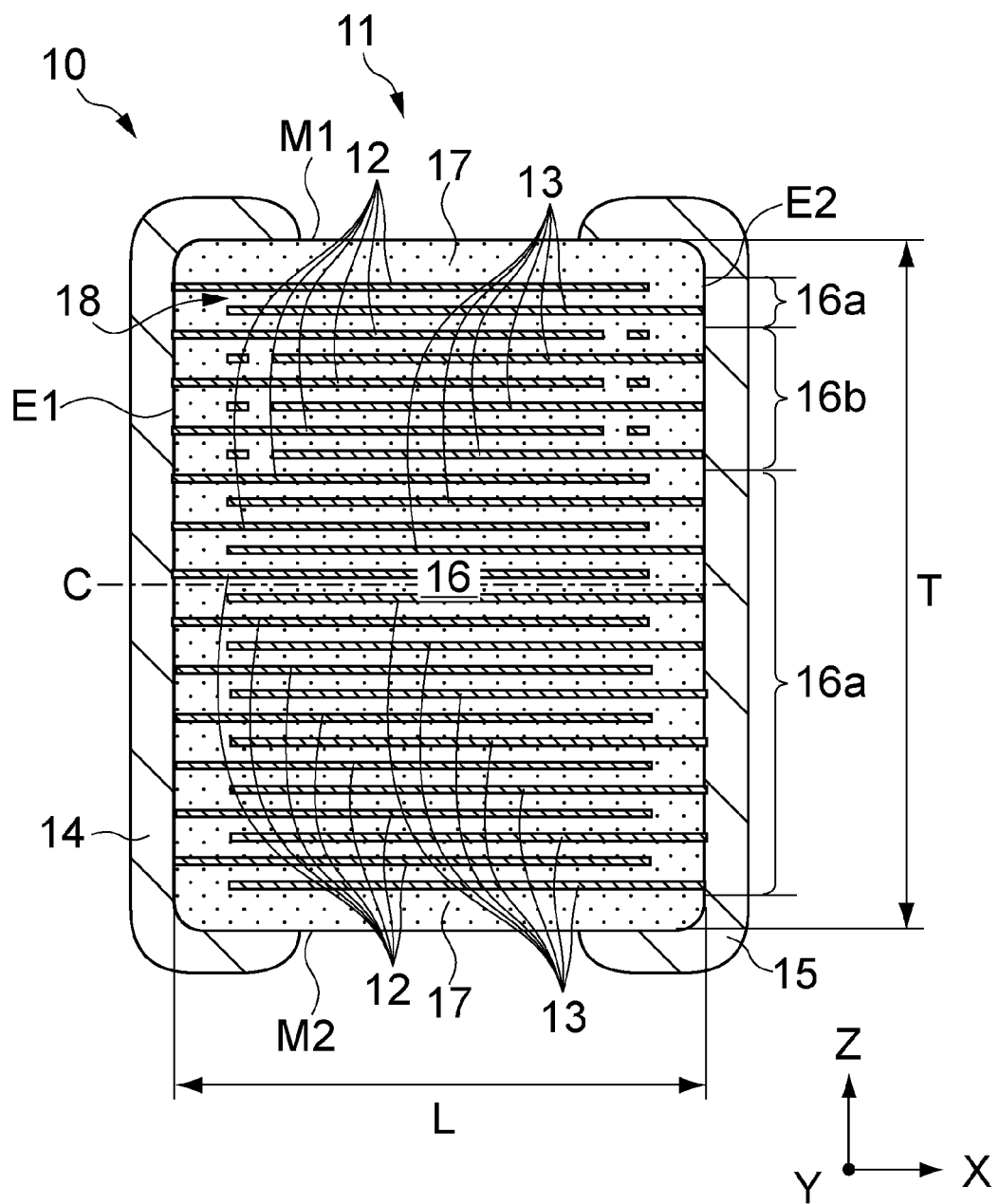
FIG. 2 is a cross-sectional view of the multilayer ceramic capacitor taken along the line A-A' in FIG. 1.
Figure 3:
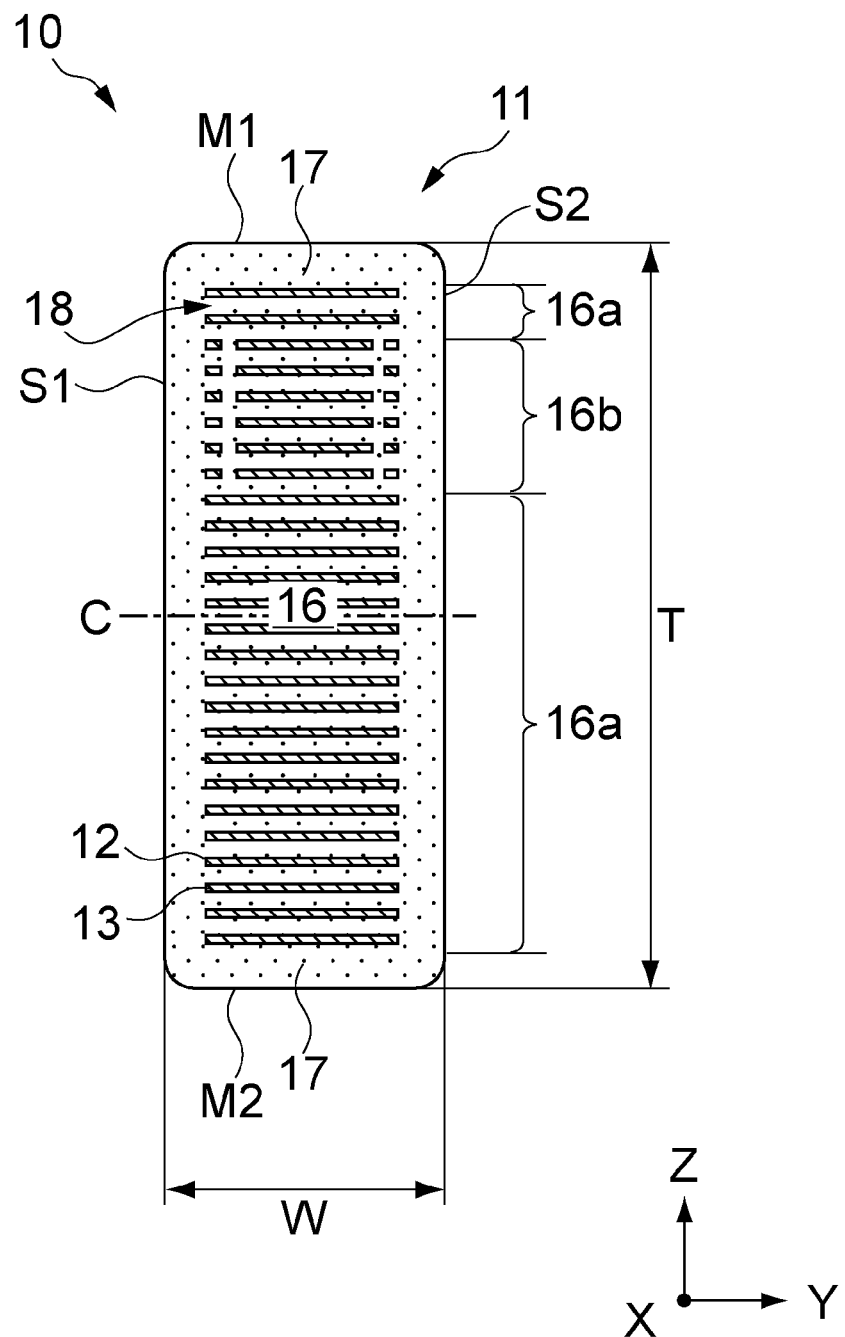
FIG. 3 is a cross-sectional view of the multilayer ceramic capacitor taken along the line B-B' of FIG. 1.

FIGS. 1 to 3 are diagrams showing the multilayer ceramic capacitor 10 according to an embodiment of the present invention. FIG. 1 is a perspective view of the multilayer ceramic capacitor 10. FIG. 2 is a cross-sectional view of the multilayer ceramic capacitor 10 taken along the line A-A' in FIG. 1. FIG. 3 is a cross-sectional view of the multilayer ceramic capacitor 10 taken along the line B-B' of FIG. 1.

The multilayer ceramic capacitor 10 includes a ceramic body 11, a first external electrode 14, and a second external electrode 15. The ceramic body 11 is configured as a hexahedron having first and second main surfaces M1 and M2 orthogonal to the Z axis, first and second end surfaces E1 and E2 orthogonal to the X axis, and a pair of side surfaces S1 and S2 orthogonal to the Y axis.

The main surfaces M1 and M2, the end surfaces E1 and E2, and the side surfaces S1 and S2 of the ceramic body 11 are all flat surfaces. The flat surface according to the present embodiment does not have to be strictly a flat surface as long as it is recognized as flat when viewed as a whole. It also includes surfaces that have a gently curved shape, etc.

The multilayer ceramic capacitor 10 is configured as a tall type in which the dimension T in the Z-axis direction of the ceramic body 11 is larger than the dimension W in the Y-axis direction. In the multilayer ceramic capacitor 10, the dimension T of the ceramic body 11 is 1.2 times or more the dimension W, for example. That is, the multilayer ceramic capacitor 10 can be mounted in a limited mounting space in the Y-axis direction while securing a large capacitance by increasing the dimension T of the ceramic body 11.

Also, in the multilayer ceramic capacitor 10, the dimension L in the X-axis direction of the ceramic body 11 may be larger than the dimension W, and may be smaller than the dimension T. In the multilayer ceramic capacitor 10, the dimensions T, W, and L of the ceramic body 11 can be appropriately determined within the range satisfying the above conditions.

The external electrodes 14 and 15 cover the end surfaces E1 and E2 of the ceramic body 11, respectively. The external electrodes 14 and 15 extend from the end surfaces E1 and E2 of the ceramic body 11 to the main surfaces M1 and M2 and the side surfaces S1 and S2. As a result, the external electrodes 14 and 15 have a U-shaped cross section parallel to the XZ plane and a U-shaped cross section parallel to the XY plane.

The shape of the external electrodes 14 and 15 is not limited to that shown in FIG. 1. For example, the external electrodes 14 and 15 may extend from the respective end surfaces E1 and E2 of the ceramic body 11 to only one of the main surfaces M1 and M2, and may have an L-shaped cross section parallel to the XZ plane. Moreover, the external electrodes 14 and 15 do not have to extend to any of the main surfaces M1 and M2 and the side surfaces S1 and S2.

The external electrodes 14 and 15 are made of a metal material as the main component. Examples of metal materials forming the external electrodes 14 and 15 include copper (Cu), nickel (Ni), tin (Sn), palladium (Pd), platinum (Pt), silver (Ag), gold (Au), and alloys thereof. In this embodiment, the main component shall mean the component with the highest content ratio.

The ceramic body 11 is made of dielectric ceramics and has an electrode laminate portion 16 and a pair of cover portions 17. A pair of cover portions 17 covers the electrode laminate portion 16 from both sides in the Z-axis direction. That is, in the ceramic body 11, the pair of cover portions 17 form the main surfaces M1 and M2, and the electrode laminate portion 16 and the pair of cover portions 17 form the end surfaces E1 and E2 and the side surfaces S1 and S2.

The ceramic body 11 has a configuration in which a plurality of plate-like ceramic layers 18 extending along the XY plane are laminated in the Z-axis direction. The electrode laminate portion 16 has a plurality of sheet-like first and second internal electrodes 12 and 13 arranged between a plurality of ceramic layers 18 and extending along the XY plane. The internal electrodes 12 and 13 are not arranged in the cover portions 17.

The internal electrodes 12 and 13 are alternately arranged along the Z-axis direction, and are opposed to each other in the Z-axis direction in a "facing region" located around the center in the X-axis and Y-axis directions. The first internal electrode 12 is drawn out from the facing region to the first end surface E1 and connected to the first external electrode 14. The second internal electrode 13 is drawn out from the facing region to the second end surface E2 and connected to the second external electrode 15.

With such a configuration, in the multilayer ceramic capacitor 10, when voltage is applied between the external electrodes 14 and 15, the voltage is applied to the plurality of ceramic layers 18 between the internal electrodes 12 and 13 in the facing region. As a result, in the multilayer ceramic capacitor 10, electric charges corresponding to the voltage between the external electrodes 14 and 15 are stored.

In the ceramic body 11, dielectric ceramics with a high dielectric constant are used in order to increase the capacitance of the respective ceramic layers 18 between the internal electrodes 12 and 13. Dielectric ceramics with a high dielectric constant include, for example, perovskite structure materials containing barium (Ba) and titanium (Ti), represented by barium titanate ($BaTiO_3$).

Such dielectric ceramics may also be composite systems, such as strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium calcium titanate zirconate ($(Ba, Ca) (Zr, Ti) O_3$), barium zirconate ($BaZrO_3$), and titanium oxide ($TiO_2$).

The internal electrodes 12 and 13 are made of a metal material as a main component. A typical metal material forming the internal electrodes 12 and 13 is nickel (Ni). In addition, copper (Cu), palladium (Pd), platinum (Pt), silver (Ag), gold (Au), alloys thereof, and the like may be used.

The ceramic body 11 is laminated by laminating a plurality of ceramic layers 18 one by one in order from the bottom in the Z-axis direction in a lamination step (step S03) described later. That is, in the ceramic body 11, the ceramic layers 18 closer to the second main surface M2 are laminated earlier, and the ceramic layers 18 closer to the first main surface M1 are laminated later.

Although details will be described with reference to the lamination step (step S03), defects tend to occur more easily in either one of the Z-axis direction upper portion near the main surface M1 and the Z-axis direction lower portion near the second main surface M2.

Such a tendency is more conspicuous in a tall configuration in which the dimension T in the Z-axis direction of the ceramic body 11 is larger than the dimension W in the Y-axis direction, as in the present embodiment. In this regard, the multilayer ceramic capacitor 10 is configured such that the main surfaces M1 and M2 of the ceramic body 11, which are identical in appearance, are distinguishable.

Therefore, in the multilayer ceramic capacitor 10, it is possible to determine on which side of the main surface M1 or M2 of the ceramic body 11 the cause of the defect exists, thereby making it possible to take appropriate countermeasures against the occurrence of the defect. In the multilayer ceramic capacitor 10, the internal electrodes 12 and 13 are used as a mark or indicia for distinguishing the main surfaces M1 and M2 of the ceramic body 11.

To this end, the first and second internal electrodes 12, 13 are respectively composed of first and second standard internal electrodes 12a, 13a and first and second special internal electrodes 12b, 13b. That is, the first internal electrodes 12 include first standard internal electrodes 12a and first special internal electrodes 12b, and the second internal electrodes 13 include second standard internal electrodes 13a and second special internal electrodes 13b.

The electrode laminate portion 16 has a standard section 16a in which the standard internal electrodes 12a and 13a are arranged and a special section 16b in which the special internal electrodes 12b and 13b are arranged, which are sections divided in the Z-axis direction. In the electrode laminate portion 16, the standard section 16a occupies most of the region, and the special section 16b occupies a part of the region closer to the first main surface M1 than the center plane C in the Z-axis direction.

Figure 4A:
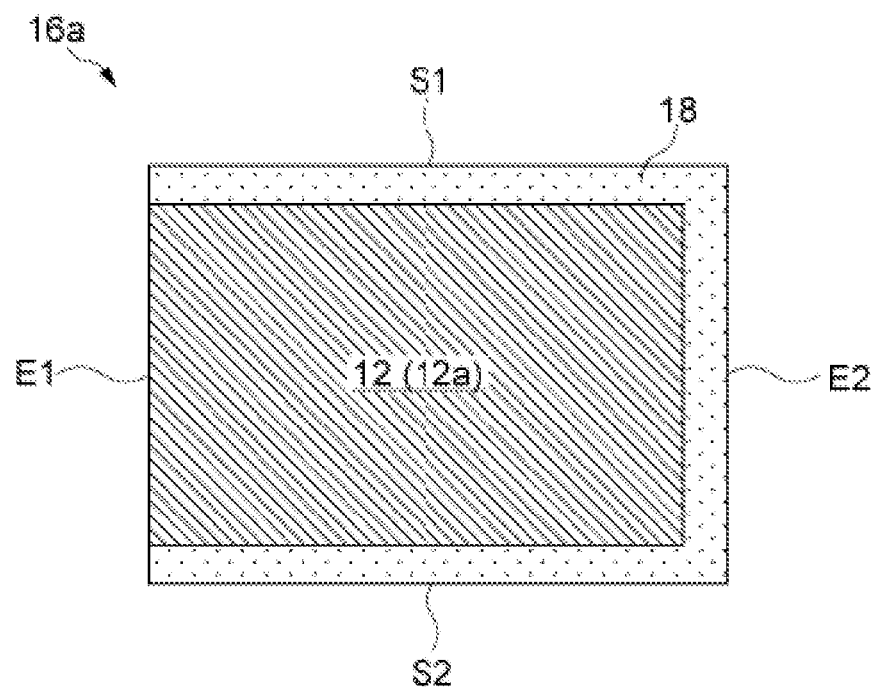
FIGS. 4A-4B are plan views of standard internal electrodes of the multilayer ceramic capacitor.
Figure 4B:
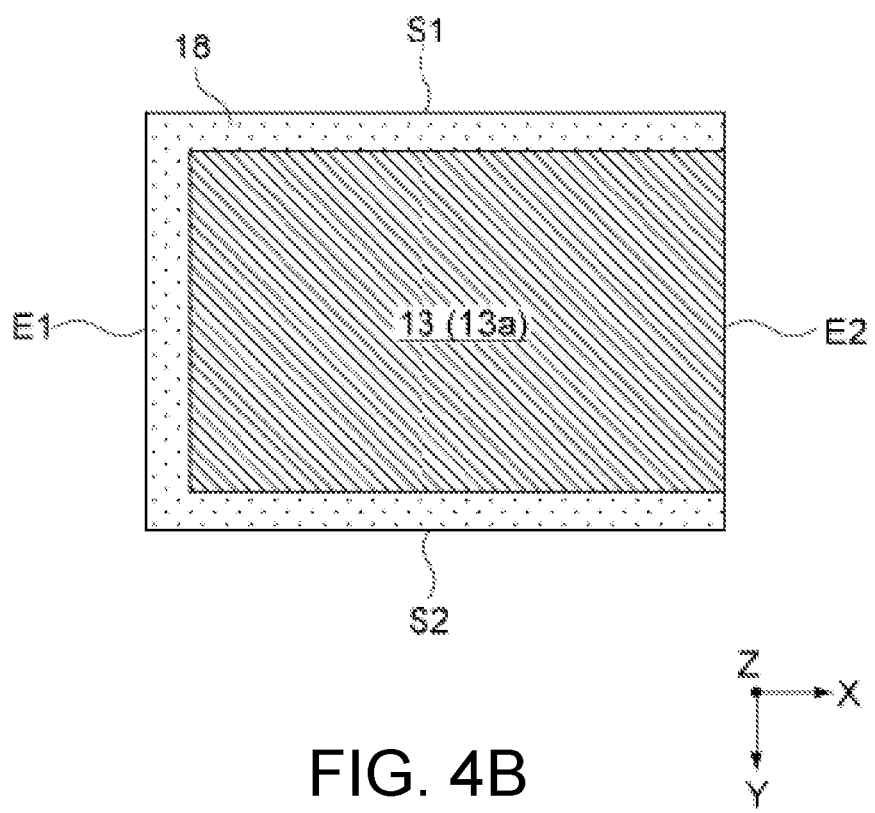

FIGS. 4A and 4B are plan views showing the ceramic layers 18 each formed with the standard internal electrodes 12a and 13a in the standard section 16a. Specifically, FIG. 4A shows the ceramic layer 18 on which the first standard internal electrode 12a is formed, and FIG. 4B shows the ceramic layer 18 on which the second standard internal electrode 13a is formed.

As shown in FIGS. 4A and 4B, the standard internal electrodes 12a and 13a have a common planar shape. That is, the first standard internal electrode 12a shown in FIG. 4A and the second standard internal electrode 13a shown in FIG. 4B have a positional relationship in which one is left-right reversed relative to the other with respect to a center line passing through the center in the X-axis direction of the ceramic layer 18 and parallel to the Y-axis.

Both the standard internal electrodes 12a and 13a have a planar shape that extends without gaps inside their rectangular outlines. Both the standard internal electrodes 12a, 13a are spaced apart from the side surfaces S1, S2. The first standard internal electrode 12a is spaced from the second end surface E2, and the second standard internal electrode 13a is spaced from the first end surface E1.

Figure 5A:
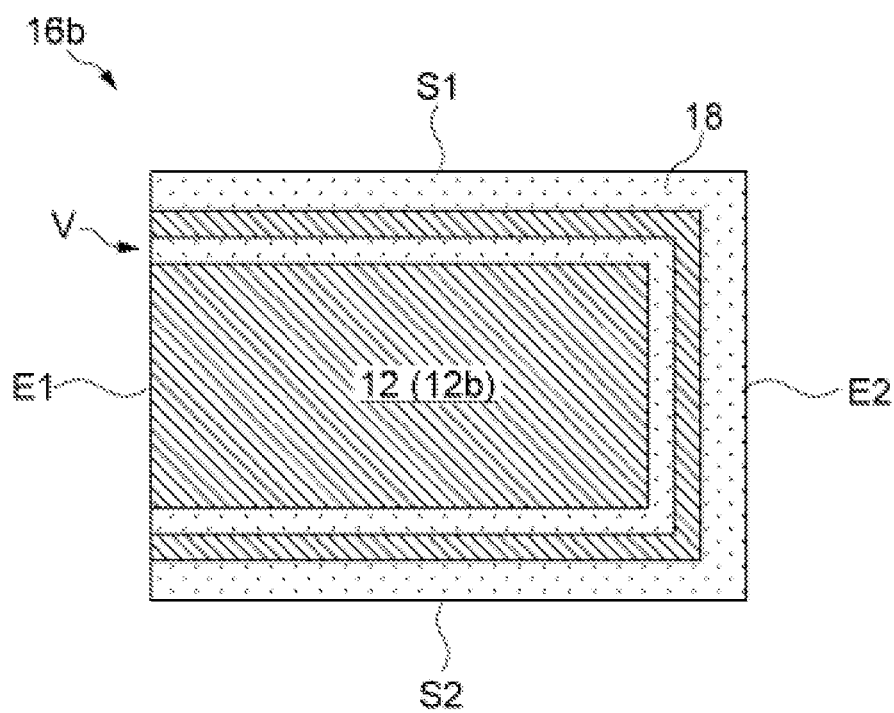
FIGS. 5A-5B are plan views of special internal electrodes of the multilayer ceramic capacitor.
Figure 5B:
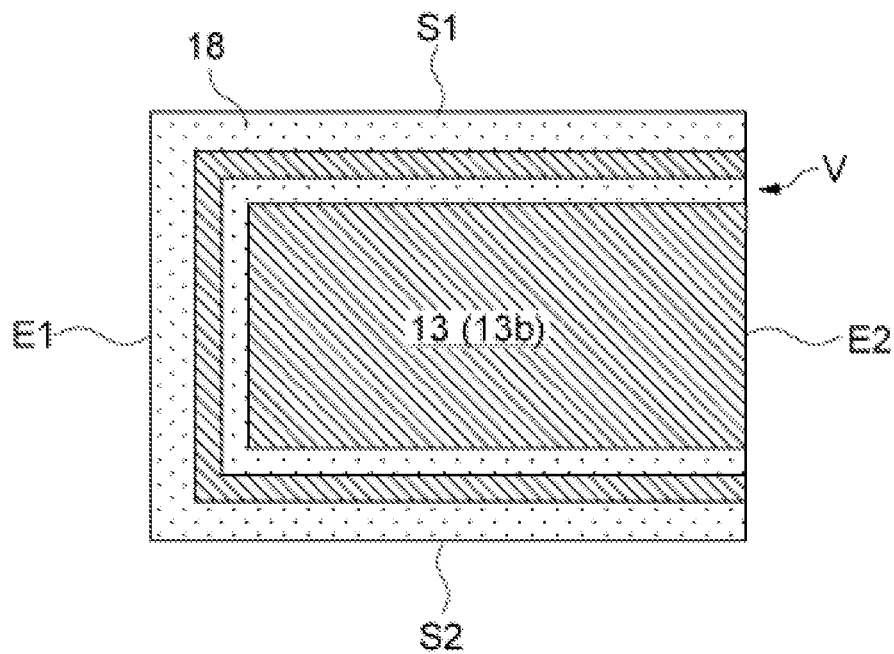

FIGS. 5A and 5B are plan views showing the ceramic layers 18 each formed with the special internal electrodes 12b and 13b in the special section 16b. Specifically, FIG. 5A shows the ceramic layer 18 on which the first special internal electrode 12b is formed, and FIG. 5B shows the ceramic layer 18 on which the second special internal electrode 13b is formed.

As shown in FIGS. 5A and 5B, the special internal electrodes 12b and 13b have a mutually common planar shape. That is, the first special internal electrode 12b shown in FIG. 5A and the second special internal electrode 13b shown in FIG. 5B has a positional relationship in which one is left-right reversed relative to the other with respect to a center line passing through the center in the X-axis direction of the ceramic layer 18 and parallel to the Y-axis.

Each of the special internal electrodes 12b, 13b has a planar shape in which a void V is formed in the standard internal electrodes 12a, 13a. That is, each of the special internal electrodes 12b, 13b has a rectangular contour that is the same as the standard internal electrodes 12a, 13a, but differs from the standard internal electrodes 12a, 13a in that the void V forming a gap is provided.

As shown in FIGS. 5A and 5B, the voids V of the special internal electrodes 12b and 13b are formed in the form of continuous slits along the inside of the three sides other than the sides drawn out to the end surfaces E1 and E2. The slit-shaped void V penetrates to the end surfaces E1 and E2, and divides each of the special internal electrodes 12b and 13b into an inner region and an outer region.

In the multilayer ceramic capacitor 10, each of the main surfaces M1 and M2 can be identified by using the special section 16b in which the plurality of special internal electrodes 12b and 13b are successively arranged as a mark. That is, of the main surfaces M1 and M2, the one closer to the special section 16b is the first main surface M1, and the one farther from the special section 16b is the second main surface M2.

The position of the special section 16b in the ceramic body 11 can be detected using, for example, an ultrasonic microscope. That is, when the ceramic body 11 is observed with an ultrasonic microscope using the main surface M1 or M2 as ultrasonic wave irradiation surfaces, it is determined whether the irradiation surface is the main surface M1 or M2 depending on the depth of the detected special section 16b.

In the special section 16b, the voids V of the special internal electrodes 12b and 13b overlap in the Z-axis direction at two portions extending in the X-axis direction along the side surfaces S1 and S2. Because of this, it becomes easier to visually recognize the special section 16b through the ultrasonic microscope observation. Thereby, the position of the special section 16b can be detected satisfactorily.

Also, in the special section 16b, it is preferable that the total lamination number of the special internal electrodes 12b and 13b is 3 or more so as to enable good detection by an ultrasonic microscope. Further, in the special section 16b, in order to suppress the decrease in capacitance due to the voids V, the total number of lamination of the special internal electrodes 12b and 13b is preferably set to 30% or less with respect to the total number of the internal electrodes including the standard internal electrodes 12a and 13a and the special internal electrodes 12b and 13b.

[Manufacturing Method of Multilayer Ceramic Capacitor 10]

Figure 6:
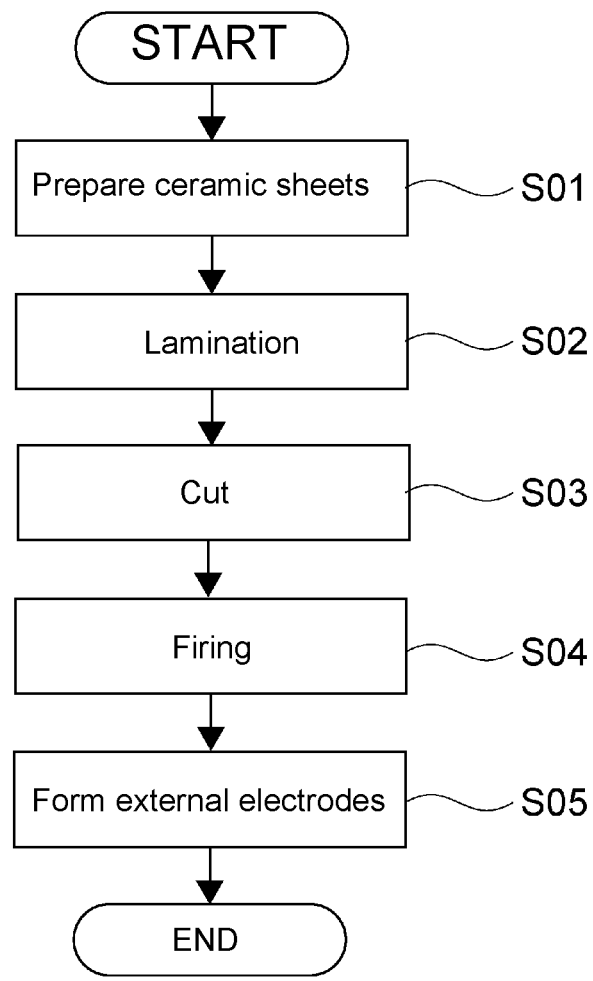
FIG. 6 is a flow chart showing a method for manufacturing the multilayer ceramic capacitor.

FIG. 6 is a flow chart showing a manufacturing method of the multilayer ceramic capacitor 10 according to this embodiment. FIGS. 7 to 11 are diagrams showing the manufacturing process of the multilayer ceramic capacitor 10. Hereinafter, a method for manufacturing the multilayer ceramic capacitor 10 will be described along FIG. 6 with reference to FIGS. 7 to 11 as appropriate.

(Step S01: Ceramic Sheet Preparation)

In step S01, first and second standard ceramic sheets 101a and 102a for forming the standard section 16a of the electrode laminate portion 16, first and second special ceramic sheets 101b and 102b for forming the special section 16b of the electrode laminate portion 16, and cover ceramic sheets 103 for forming the cover portions 17 are prepared.

Each of the ceramic sheets 101a, 101b, 102a, 102b, and 103 is configured as an unfired dielectric green sheet containing dielectric ceramics as a main component. The ceramic sheets 101a, 101b, 102a, 102b, and 103 are formed into sheets using, for example, a roll coater or a doctor blade.

Figure 9:
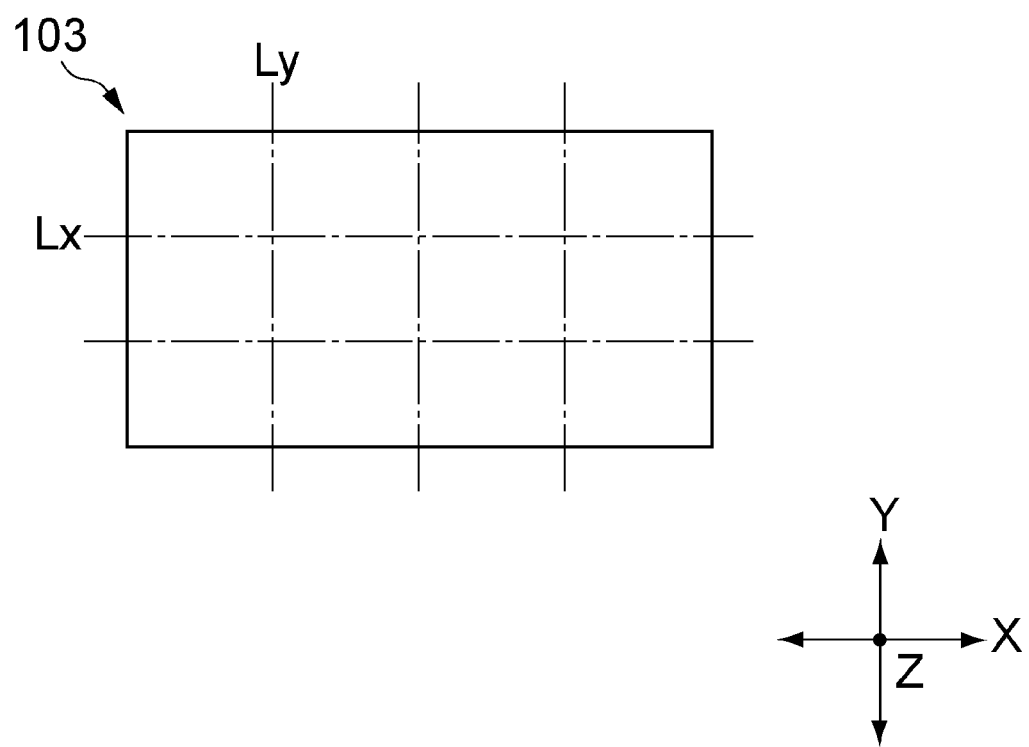
FIG. 9 is a plan view of a cover ceramic sheet prepared in step S01.

FIG. 7A is a plan view of the first standard ceramic sheet 101a. FIG. 7B is a plan view of the second standard ceramic sheet 102a. FIG. 8A is a plan view of the first special ceramic sheet 101b. FIG. 8B is a plan view of the second special ceramic sheet 102b. FIG. 9 is a plan view of the cover ceramic sheet 103.

At this stage, the ceramic sheets 101a, 102a, 101b, 102b, and 103 are configured as large-sized sheets that have not been singulated. In FIGS. 7 to 9, first cutting lines Lx parallel to the X-axis and second cutting lines Ly parallel to the Y-axis are indicated by dashed-dotted lines as cutting lines for individualizing each multilayer ceramic capacitor 10.

Unfired conductor patterns 112a and 113a corresponding to the standard internal electrodes 12a and 13a are formed on the standard ceramic sheets 101a and 102a, respectively. Unfired conductor patterns 112b and 113b corresponding to the special internal electrodes 12b and 13b are formed on the special ceramic sheets 101b and 102b, respectively.

The unfired conductor pattern is not formed on the cover ceramic sheet 103 corresponding to the cover portion 17 in which the internal electrodes are not provided. Moreover, the composition of the cover ceramic sheet 103 corresponding to the cover portion 17 that does not contribute to the formation of capacitance may be different from that of the ceramic sheets 101a, 102a, 101b, and 102b.

The conductor patterns 112a, 113a, 112b, 113b are formed by applying a conductor paste containing a metal material as a main component to the ceramic sheets 101a, 102a, 101b, 102b, respectively. A method for applying the conductive paste can be appropriately selected from known techniques, and for example, a screen printing method or a gravure printing method can be used.

Between the conductor patterns 112a/112b and the conductor patterns 113a/113b, gaps in the X-axis direction are formed along the cutting line Ly every other cutting line Ly. Between the conductor patterns 112a/112b and the conductor patterns 113a/113b, the gaps are alternately arranged along the X-axis direction.

(Step S02: Lamination)

Figure 10:
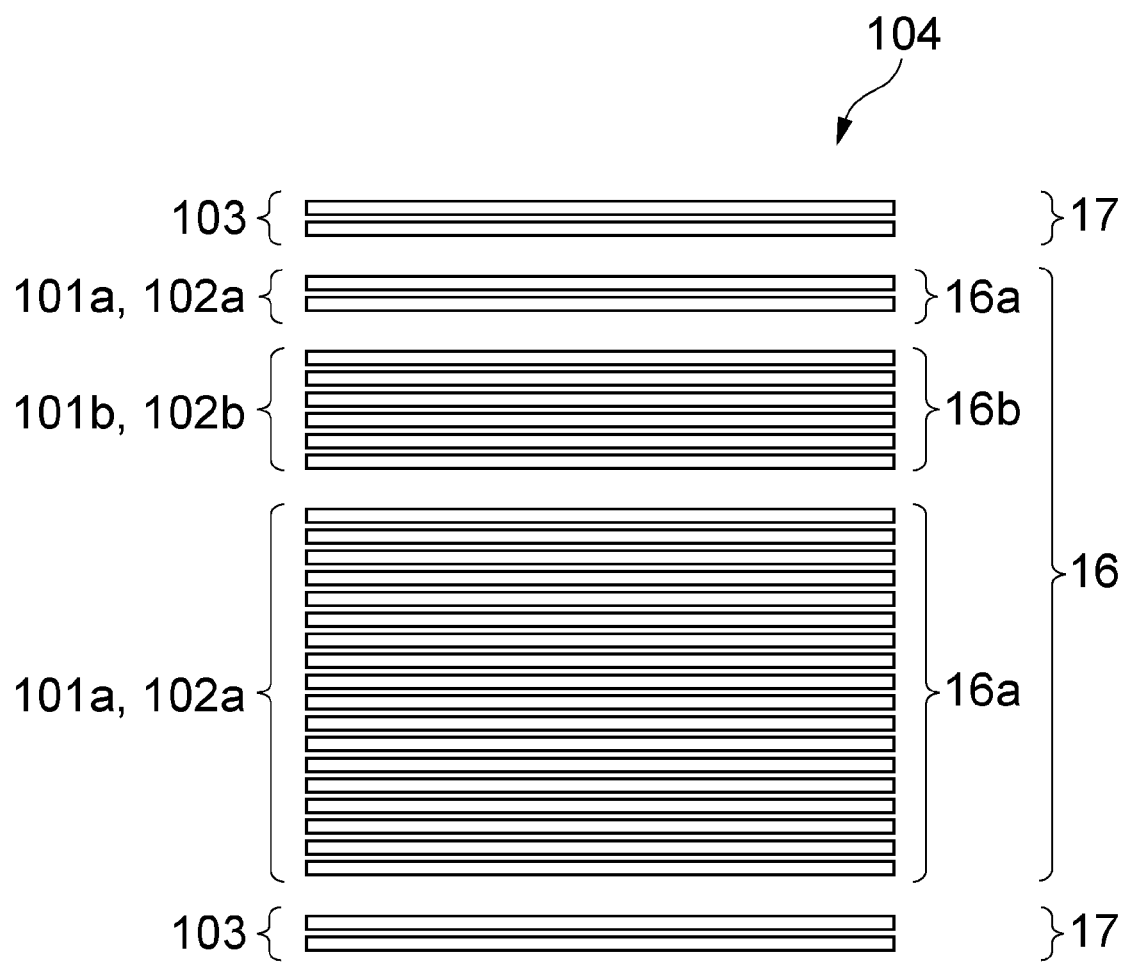
FIG. 10 is a schematic diagram showing step S02.

In step S02, the ceramic sheets 101a, 102a, 101b, 102b, and 103 prepared in step S01 are laminated as shown in FIG. 10 to form laminated sheets 104. In FIG. 10, the ceramic sheets 101a, 102a, 101b, 102b, and 103 are shown separated from each other for convenience of explanation.

In the laminated sheets 104, the standard ceramic sheets 101a and 102a are alternately laminated in the Z-axis direction at positions corresponding to the standard section 16a of the electrode laminated portion 16. In the laminated sheets 104, the special ceramic sheets 101b and 102b are alternately laminated in the Z-axis direction at positions corresponding to the special section 16b of the electrode laminated portion 16.

In the laminated sheets 104, the cover ceramic sheets 103 corresponding to the cover portions 17 are laminated from both upper and lower sides in the Z-axis direction of the ceramic sheets 101a, 102a, 101b, and 102b laminated at positions corresponding to the electrode laminated portion 16. The number of the cover ceramic sheets 103 successively laminated defines the thickness of the cover portion 17.

In step 502, the ceramic sheets 101a, 102a, 101b, 102b, and 103 are stacked one by one in order from the bottom in the Z-axis direction, and pressure is applied each time they are stacked. Therefore, in the laminated sheets 104, the number of times pressurizations occur is larger in the lower portion in the Z-axis direction, and the number of times pressurizations occur is smaller in the upper portion in the Z-axis direction.

Therefore, in the laminated sheets 104, the total pressure applied to the lower part in the Z-axis direction may be excessive, or the pressure may be insufficient in the upper part in the Z-axis direction. Due to this, in the multilayer ceramic capacitor 10, there is a tendency that defects are likely to occur in the upper portion or lower portion of the ceramic body 11 in the Z-axis direction.

On the other hand, in the laminated sheets 104, by arranging the special ceramic sheets 101b and 102b only on the upper side in the Z-axis direction, it is possible to provide a structural difference between the upper side and the lower side in the Z-axis direction. As a result, this structural difference in the laminated sheets 104 appears as the special section 16b of the electrode laminated portion 16 in the ceramic body 11 after the manufacture.

(Step S03: Cut)

Figure 11:
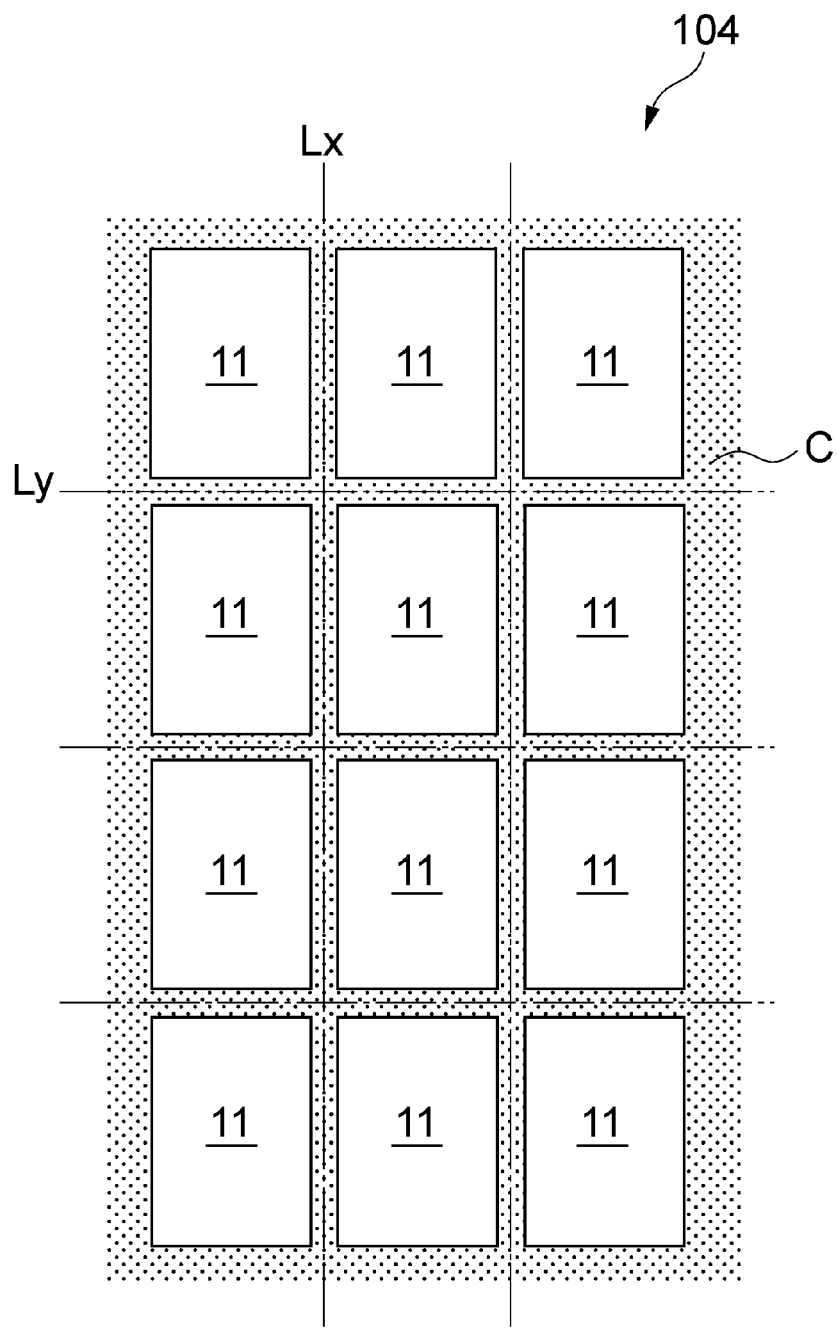
FIG. 11 is a plan view showing step S03.
Figure 11:
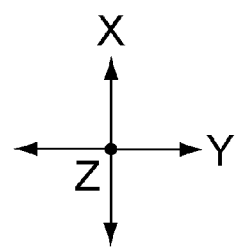

In step S03, the unfired ceramic bodies 11 are obtained by cutting the laminated sheets 104 obtained in step S02 along cutting lines Lx and Ly as shown in FIG. 11. For cutting the laminated sheets 104 in step S03, for example, a cutting device equipped with a press cutting blade, a dicing device equipped with a rotary blade, or the like can be used.

(Step S04: Firing)

In step S04, the ceramic body 11 obtained in step S03 is fired. The firing temperature in step S05 can be about 1000° C. to about 1300° C. when using a barium titanate (BaTiO$_3$)-based material, for example. Also, the firing can be performed, for example, in a reducing atmosphere or in a low oxygen partial pressure atmosphere.

(Step S05: External Electrode Formation)

In step S05, external electrodes 14 and 15 are formed on both ends of the ceramic body 11 obtained in step S04 in the X-axis direction to fabricate the multilayer ceramic capacitor 10 shown in FIGS. 1-3. A method for forming the external electrodes 14 and 15 in step S05 can be appropriately selected from known methods.

[Other Configuration Examples of the Special Section 16b]

In the ceramic body 11, it is sufficient if the structural difference can be provided between the first main surface M1 side and the second main surface M2 side by the special section 16b in which the special internal electrodes 12b and 13b having different structures from the standard internal electrodes 12a and 13a are successively arranged. Therefore, in the multilayer ceramic capacitor 10, the configuration of the special section 16b is not limited to the above example.

For example, it is sufficient if the position of the special section 16b is not at the center of the ceramic body 11 in the Z-axis direction, and is closer to one of the main surfaces M1 and M2. That is, the special section 16b may be provided at a position closer to the second main surface M2 side. Further, the special section 16b may form one of the main surfaces M1 and M2 of the electrode laminated portion 16.

Figure 12:
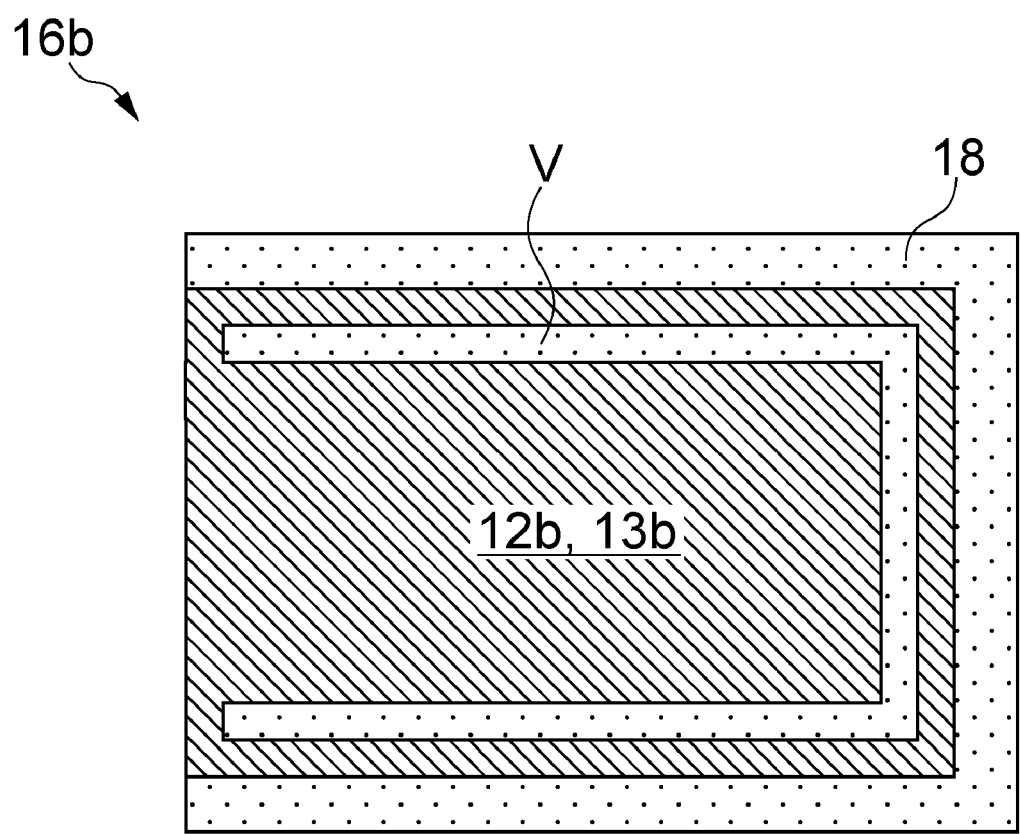
FIG. 12 is a plan view showing another embodiment of the special internal electrodes of the multilayer ceramic capacitor.

Also, the planar shape of the special internal electrodes 12b and 13b is not limited to the above example. For example, in the special internal electrodes 12b and 13b, as shown in FIG. 12, by arranging the entire slit-shaped void V inside the outline of the rectangle without extending the slit-shaped void V to the end surface, a large connection width for the external electrodes 14 and 15 can be secured.

Figure 13:
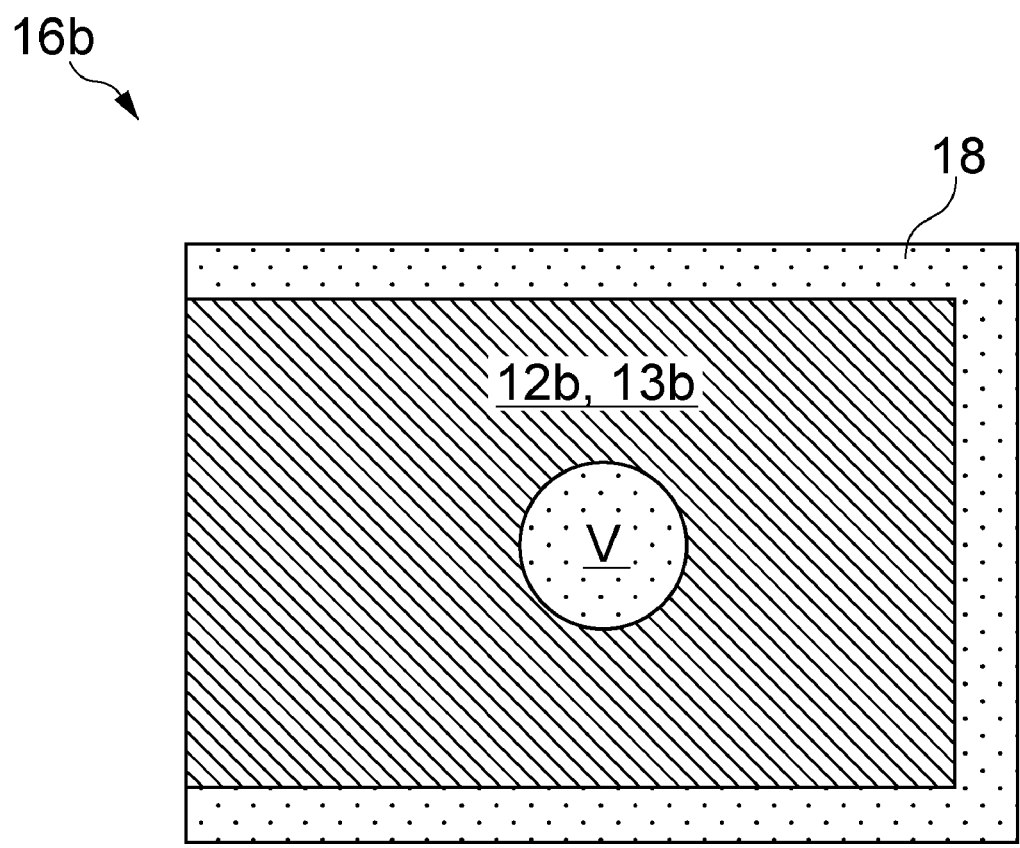
FIG. 13 is a plan view showing another embodiment of special internal electrodes of the multilayer ceramic capacitor.

Furthermore, in the special internal electrodes 12b and 13b, the shape of the void V may not need to be slit-like, and may be any shape such as the circular shape shown in FIG. 13, for example. In any case, it is preferable that at least part of the gap V in the special internal electrodes 12b and 13b overlap in the Z-axis direction from the viewpoint of better detection by an ultrasonic microscope.

Figure 14:
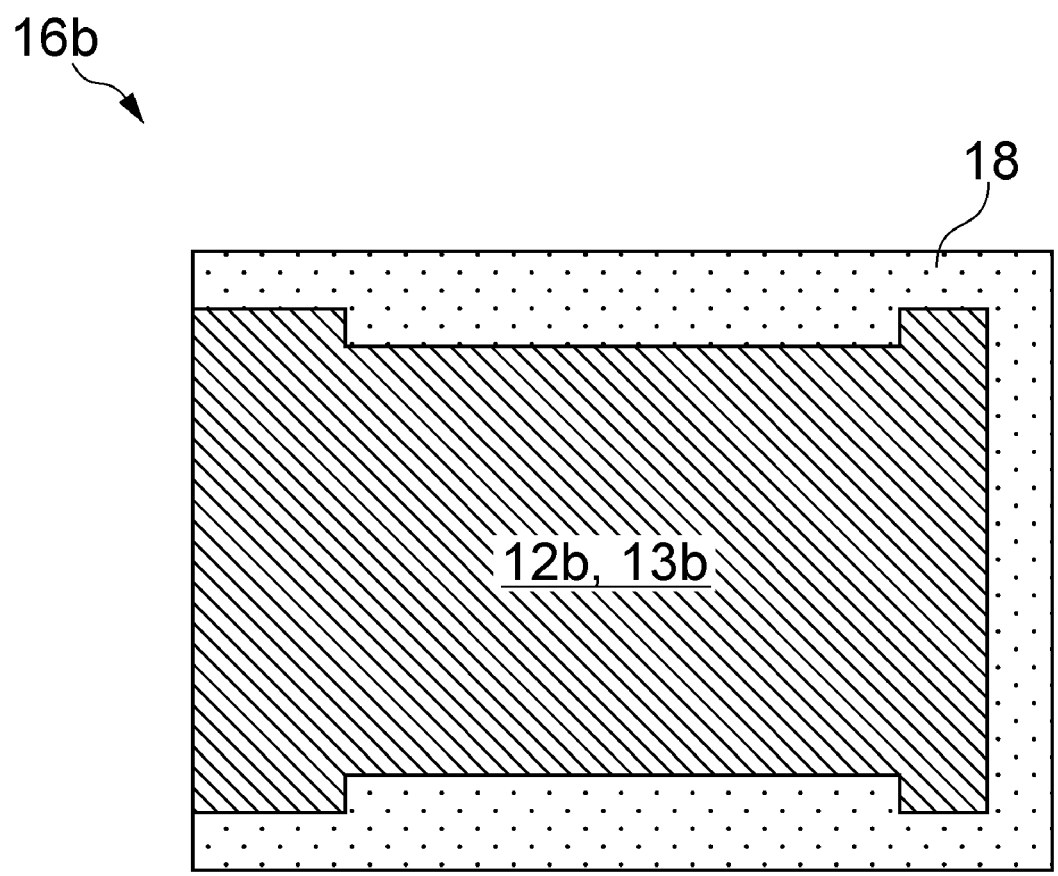
FIG. 14 is a plan view showing another embodiment of the special internal electrodes of the multilayer ceramic capacitor.

In addition, the special internal electrodes 12b and 13b may not need to have the void V inside as long as the planar shape is different from that of the standard internal electrodes 12a and 13a. For example, as shown in FIG. 14, the special internal electrodes 12b and 13b may have a planar shape that extends without gaps inside a contour that is different from that of the standard internal electrodes 12a and 13a.

Further, the structural difference from the standard internal electrodes 12a, 13a provided in the special internal electrodes 12b, 13b is not limited to the planar shape, as long as the structure allows non-destructive detection of the position thereof in the ceramic body 11. An ultrasonic microscope is an example of the non-destructive detection device used to detect the positions of the special internal electrodes 12b and 13b within the ceramic body 11.

A configuration other than the planar shape that provides the special internal electrodes 12b and 13b with a structural difference from the standard internal electrodes 12a and 13a includes, for example, a different area density of the metal material. In the standard internal electrodes 12a, 13a and the special internal electrodes 12b, 13b, the area density of the metal material can be made different from each other depending on the amount of dispersed pores.

The area density of the metal material in the special internal electrodes 12b, 13b can be controlled, for example, by the amount of ceramic powder (co-material) added to the conductive paste used to form the conductor patterns 112b, 113b in step S01. That is, by adding a large amount of ceramic powder, the area density of the metal material can be lowered.

By making the area density of the metal material different between the standard internal electrodes 12a, 13a and the special internal electrodes 12b, 13b, it is possible to distinguish between the standard section 16a and the special section 16b by the brightness of the image observed with an ultrasonic microscope. In other words, by lowering the area density of the metal material, the image observed by the ultrasonic microscope is observed dark.

Figure 15:
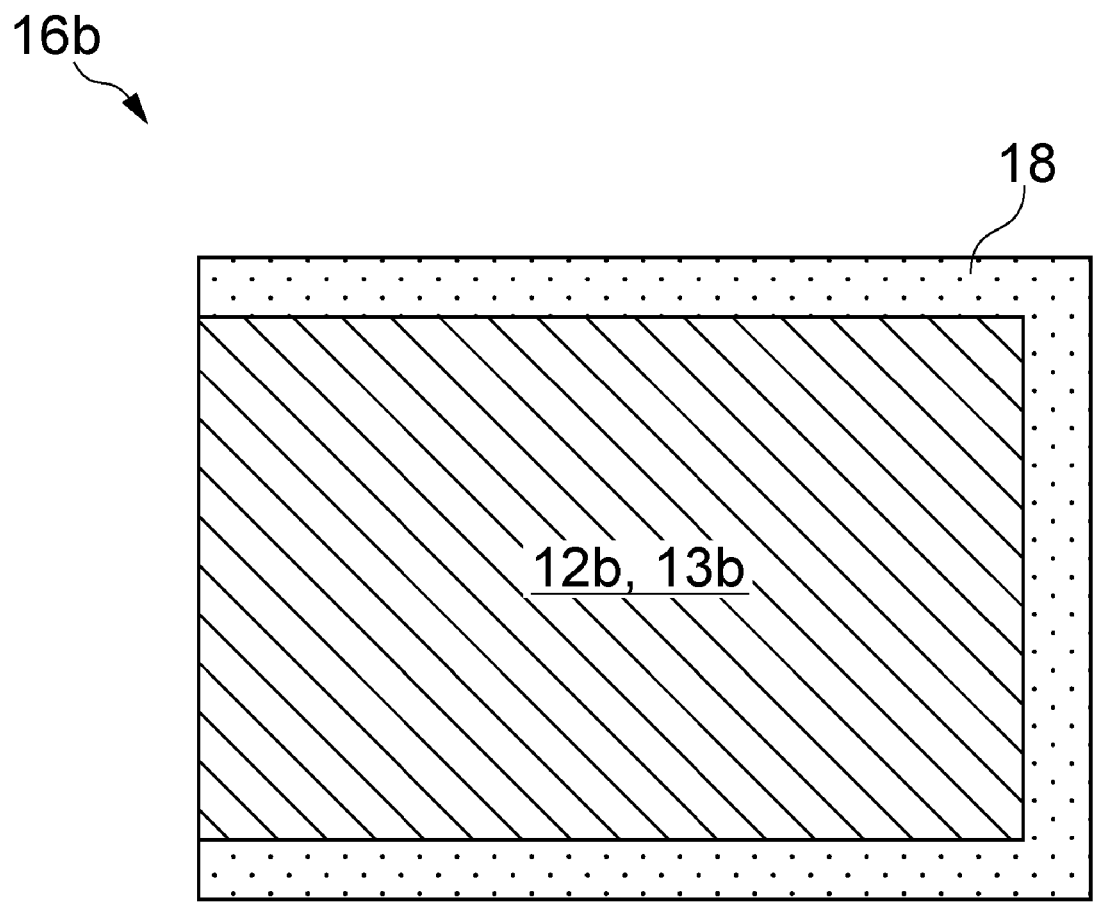
FIG. 15 is a plan view showing another embodiment of special internal electrodes of the multilayer ceramic capacitor.

FIG. 15 shows special internal electrodes 12b and 13b having a lower area density of metal material than standard internal electrodes 12a and 13a. In the configuration using the special internal electrodes 12b and 13b shown in FIG. 15, a darker image is observed in the special section 16b than in the standard section 16a with an ultrasonic microscope, so the position of the special section 16b can be detected.

[Other Embodiments]

Although the embodiments of the present invention have been described above, it goes without saying that the present invention is not limited to the above-described embodiments and can be modified in various ways.

For example, the effects of the present invention can be obtained more effectively in high-profile multilayer ceramic capacitors, but can also be obtained in non-high-profile multilayer ceramic capacitors. In other words, in the multilayer ceramic capacitor, the effects of the present invention can be obtained even in a configuration having ceramic bodies with arbitrary dimensions T, W, and L.

Also, the multilayer ceramic capacitor according to the present invention is not limited to the above-described two-terminal type having two external electrodes. That is, the multilayer ceramic capacitor according to the present invention may be of a multi-terminal type having three or more external electrodes, for example, a four-terminal type having four external electrodes.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multilayer ceramic capacitor, comprising:
   a ceramic body having first and second main surfaces perpendicular to a first axis and first and second end surfaces perpendicular to a second axis orthogonal to the first axis, the ceramic body including:
   a plurality of ceramic layers laminated in a direction of the first axis, and
   a plurality of first and second internal electrodes alternately laminated with the plurality of ceramic layers respectively interposed therebetween in the direction of the first axis, the first and second internal electrodes being drawn out to the first and second end surfaces, respectively; and first and second external electrodes covering the first and second end surfaces of the ceramic body, respectively, wherein the plurality of first and second internal electrodes include a plurality of first and second standard internal electrodes and a plurality of first and second special internal electrodes, wherein in the plurality of first and second special internal electrodes, an area density of a metal material is lower than that in the plurality of first and second standard internal electrodes, and wherein the plurality of first and second special internal electrodes are successively laminated in a section of the ceramic body that is closer to one side of one of the first and second main surfaces than a center in the direction of the first axis.

2. The multilayer ceramic capacitor according to claim 1, wherein the plurality of first and second special internal electrodes respectively have a first common configuration, and the plurality of first and second special internal electrodes respectively have a second common configuration different from the first common configuration.

3. The multilayer ceramic capacitor according to claim 1, the plurality of first and second special internal electrodes respectively have a first planar shape that is different from a second planar shape of the plurality of first and second standard internal electrodes.

4. The multilayer ceramic capacitor according to claim 3, wherein a gap is provided in the second planar shape of the first and second special internal electrodes.

5. The multilayer ceramic capacitor according to claim 3, wherein the second planar shape is substantially a rectangle with a cutout area, and the first planar shape is substantially the rectangle without the cutout area.

6. The multilayer ceramic capacitor according to claim 1, wherein in the ceramic body, a dimension in the direction of the first axis is larger than a dimension in a direction of a third axis perpendicular to the first axis and the second axis.

* * * * *